Jan. 26, 1965 YUAN-HENG DSCHEN 3,167,362
GAS-LUBRICATED JOURNAL BEARING
Filed July 9, 1962
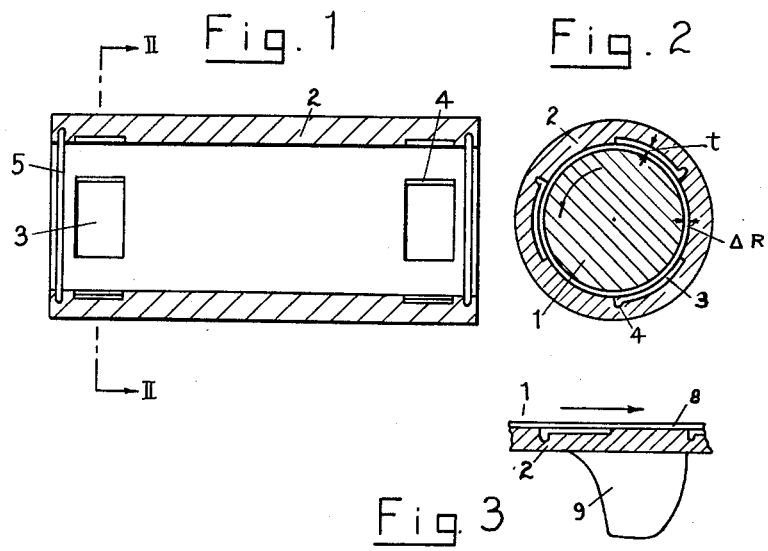
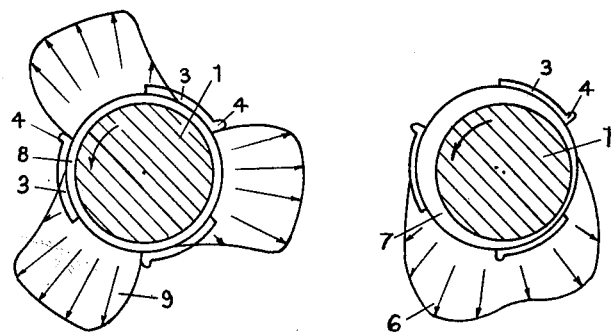
INVENTOR.
Yuan-Heng Dschen
BY
Pierce, Scheffler & Parker
attorneys

United States Patent Office 3,167,362
Patented Jan. 26, 1965

3,167,362
GAS-LUBRICATED JOURNAL BEARING
Yuan-Heng Dschen, Baden, Switzerland, assignor to Aktiengesellschaft Brown, Boveri & Cie, Baden, Switzerland, a joint-stock company
Filed July 9, 1962, Ser. No. 208,260
Claims priority, application Switzerland July 10, 1961
5 Claims. (Cl. 308—121)

The invention relates to a hydro-dynamic gas-lubricated journal bearing for high rotational speeds, with cylindrical bore and with recesses in the bearing surface of the bearing bushing.

The lubrication of journal bearings with gas instead of with oil becomes necessary with special applications of turbines and compressors which run at extremely low or high temperatures, or which work in the circuit of gas-cooled reactors. The effect of the widely varying characteristics of oils and gases as lubricants—especially such important criteria to be considered as stability and bearing capacity of the bearing and, however, too the influence of the compressibility of the gases—gives rise to numerous problems with the design and construction of gas-lubricated bearings.

As the viscosity of gases is much smaller than that of the normal lubricating oils, the bearing capacity of gas-lubricated bearings remains very low too, this having a pronounced effect on starting, stopping and at low rotational speeds. The poor bearing capacity requires a high rotational speed but does not permit the latter to rise at will because instability of the shaft, characteristic with oil bearings, soon occurs. What happens in this case is a circling movement of the shaft in the bearing bushing with which the shaft centre rotates around the bushing centre with a frequency corresponding to about half the working speed of the machine. The lubricating film at the same time loses its bearing capacity, this possibly leading to bearing damage.

There are recognized bearing types having both an externally fed compressed gas supply (hydrostatically lubricated) as well as those which are self-supporting (hydrodynamically lubricated), in which connection the latter-mentioned are of special significance because of their constructional simplicity.

The simple gas-lubricated journal bearing has a smooth cylindrical bore and displays also at low speed an adequate bearing capacity. For high speed machines, however, it is not suitable as instability occurs even at relatively low rotational speeds. An improvement can be obtained with axial grooves cut in at the bearing centre, the latter extending over part of the bearing breadth. By this means a considerable increase over the original upper speed can be attained. Such grooved-bearings are still frequently accepted as being standard design for gas-lubricated journal bearings. The long, narrow and, however, deep grooves represent nonetheless a discontinuity in the bearing surface due to which certain disadvantages arise; inter alia, the bearing capacity and the stabilizing characteristic vary strongly with the direction of loading. The upper speed limit can be further raised by means of circumferential grooves situated over a part of the periphery in the end regions of the bearing bushings. These lower considerably the bearing capacity of the bearing however, because only the smooth, cylindrical portion in the middle of the bearing bushing bears load, not, however, that part in which the circumferential grooves are situated. Concerning special dimensioning and form of these grooves for the purpose of an intentional developing of pressure there is no closer information available from today's literature. With another design, the bearing surface of the bearing bushing is sub-divided into separate "dam areas" by which is to be understood rectangularly formed recesses. These recesses are connected with each other by axial and circumferential grooves and with the atmospheric environment. With this form of bearing, a good stability of the shaft movement is obtained but at low rotational speeds the bearing capacity is insufficient.

With all known gas-lubricated journal bearings, the axial and circumferential grooves which are provided communicate directly with the atmospheric environment by leading the latter out to the bearing end or by drillings. Apart from the complicated design to obviate the entry of impurities into the bearing surfaces with the sucked-in gas, the connection with the atmospheric environment permits only a poor development of pressure at low speeds and causes disturbances on starting and stopping the machine when compressed gas is employed.

Thus, the requirement arises for a gas-lubricated journal bearing which even at low speeds displays a satisfactory bearing capacity and at high speeds operates free from instability. This goal is reached with the present invention with which the recesses in the bearing surface of the bearing bushing are arranged close to both ends of the bearing and situated over the periphery in segment form; each recess is provided with an axial groove spaced inwardly from the corresponding end face of the bearing. Each groove, which is located at the entrance edge to the recess as viewed in the direction of rotation of a point on the shaft, extends for substantially the complete axial dimension of the recess and communicates with the atmospheric environment only through such running clearance as exists between the shaft and bearing surface.

In the drawing is represented a constructural example of the invention. FIG. 1 shows a longitudinal cross-section of the gas-lubricated journal bearing minus the shaft. FIG. 2 is a lateral cross-section taken from line II—II in FIG. 1 and including the shaft. FIG. 3 is a part of a development taken from FIG. 2. FIGS. 4 and 5 illustrate pressure profile curves for the bearing.

With reference now to the drawings, shaft 1 to be lubricated runs in a cylindrical bearing bushing 2, close to each end of which are situated a group of recesses 3, arranged in segment form over the periphery, the latter having no communication with one another or with the atmospheric environment except for the running clearance between the shaft and bearing surface. The breadth of these recesses in the axial direction is so gauged that it amounts at most to a sixth of the bearing breadth. Usually they are narrower and there thus remains between them a smooth middle part which has neither grooves nor holes and is usually at least two thirds of the bearing breadth. Each recess 3 is provided at its entrance edge—viewed in the rotational direction of the shaft as indicated by the arrow—with an axial groove 4 which extends at least approximately over the breadth of the recesses. The depth $t$ of the recesses is of the same order of size as the radial bearing play $\Delta R$ between shaft and bearing bushing, this play being exaggerated for purposes of illustration. Between the recesses 3 and each bearing end, circumferential grooves 5 are turned into the bearing bushing 2.

The bearing as described requires no special supply of lubricating gas as the gas adhering to the surface of the shaft, or, respectively, between the bearing bushing and shaft is sufficient. The rotation of the shaft produces, in the lubricant, hydro-dynamic forces which enable the shaft to stay apart from the bearing bushing as soon as a certain speed is attained. The gas forms a load-bearing film of lubricant by which means metallic interference of the machine parts sliding on one another is avoided.

The pressure profile curve 6 occurring at low speeds in the region of the recesses has the form as shown in FIG. 5. The height of the lubricating gap 7 is small in the loaded part of the bearing bushing; thus there occurs there a larger pressure development as with a smooth bearing surface. The influence of the axial grooves 4 is only slightly apparent. As they have no communication with the atmospheric environment except for the running clearance between the shaft and bearing surface, the pressure at the position of the grooves 4 does not fall to the environment pressure and the pressure profile curve continues over the axial grooves. Thus, in the region of the recesses too, the loaded part of the bearing bushing is drawn near for pressure development and contributes to the raising of the bearing capacity of the bearing, this being of paramount importance at low rotational speeds.

Due to the relatively low loading, usual with hydrodynamic gas-lubricated journal bearings, the shaft 4 runs approximately centrally at high speeds and the lubrication gap 8 (FIGS. 3 and 4) has thus in the developed view of FIG. 3 parallel, terraced lubricating surfaces which are well known to be suitable for a large development of pressure. The resulting pressure profile curve is illustrated in FIG. 3 by curve 9 and in FIG. 4 represented over the whole bearing circumference. The pressure curves begin at an axial groove 4, build up in proportion to the speed according to a definite law and sink again to the original pressure at the next axial groove. This, however, explains too the purpose of the axial grooves. They do not serve for the introduction or distribution of the lubricating gas—and as a consequence are not connected with the atmospheric environment through special channels—but have the task of breaking up the pressure profile curves forming in the region of the recesses. This gives rise to pressure zones of sector form, which guarantees a good shaft stability, as is known from journal bearing practice.

In the constructional example, the bearing bushing is provided with three recesses 3 but it is also possible to have a larger number. Usually they are distributed over the periphery of the bearing bushing and have similar dimensions because this results in the formation of three equally large stabilizing force components. The recesses 3 can, however, be of differing sizes too and arranged asymmetrically; by this means, the force components too are unequal with the consequent resultant force being called upon to carry the bearing load. When circumferential grooves 5 are present, which is not always necessary, the lubricating gas in the bearing forms a closed system within itself. The gas exchange taking place at the bearing ends in the axial direction can only extend to the circumferential grooves 5; in this way the danger of contamination of the lubricating gas is avoided.

The improved journal bearing according to the invention permits a considerable rise in the maximum operating speed of the shaft to take place as compared with the known designs, at the same time avoiding the disadvantages of the latter. At low speeds, the bearing ends provided with recesses assume a part of the load. The bearing thus operates in this speed range approximately like a smooth gas-lubricated journal bearing of the same axial length and with a corresponding bearing capacity. At high speeds at which the bearing capacity of the smooth middle section is sufficient by itself, the two bearing ends assume the function of shaft stabilization. The recesses 3 are located close to the bearing ends. As the middle section thus consists of a smooth cylindrical bearing surface without any irregularities, the bearing is unaffected by the direction of loading, the latter being of importance in view of the rotating forces which can have strong effects especially at high speeds. The recesses have no communication with the atmospheric environment except for the running clearance between the shaft and bearing surface and thus there is no fear of contamination of the lubricating gas.

The aforementioned advantages and characteristics of the bearing in accordance with the invention thus guarantee trouble-free operation of machines equipped with such bearings.

I claim:

1. In a hydro-dynamic gas-lubricated journal bearing especially for shafts operating at high rotational speeds, the combination which comprises a cylindrical bearing bushing within which the shaft is located, the interior surface of said bushing including a group of recesses situated in the vicinity of each end of said bushing, the recesses in each said group having a segmental configuration and being distributed around the internal periphery of the bushing and each said recess being provided with an axially extending groove spaced inwardly from the end face of said bushing, each said groove being located at the entrance edge to the recess as viewed in the direction of rotation of a point on the shaft and extending for substantially the complete axial dimension of said recess and being in communication with the atmospheric environment exteriorly of said bushing only through such running clearance as exists between the shaft and bearing surfaces of said bushing, the remaining interior portion of said bushing between said groups of recesses being a smooth bearing surface without any irregularities.

2. A journal bearing as defined in claim 1 wherein the recesses in each said group are distributed uniformly around the internal periphery of said bushing and have the same dimensions.

3. A journal bearing as defined in claim 2 wherein the axial dimension of each said recess amounts to at most a sixth of the axial dimension of said bushing.

4. A journal bearing as defined in claim 3 wherein the depth of each said recess below the interior surface of said bushing is of the same order of size as the radial bearing play between the surface of the shaft and the interior surface of said bushing.

5. A journal bearing as defined in claim 4 and which further includes a circumferential groove in the interior surface of said bushing between each said group of recesses and the corresponding end of said bushing.

References Cited in the file of this patent

UNITED STATES PATENTS 2,983,832    Macks _____ May 9, 1961

FOREIGN PATENTS 514,555    France _____ Mar. 14, 1921